Patented May 30, 1950

2,509,594

UNITED STATES PATENT OFFICE 2,509,594

PRODUCTION OF NICOTINANILIDE

Harry W. Grimmel, Easton, and Alfred Guenther, Riegelsville, Pa., assignors to General Aniline & Film Corporation, New York, N. Y., a corporation of Delaware No Drawing. Application April 12, 1945, Serial No. 588,074

1 Claim. (Cl. 260—295.5)

This invention relates to a new method for the production of organic amides.

There are several known methods for the preparation of organic amides which have been used with varying degrees of success. The most widely used of these prior known methods involves the reaction of carboxylic acid chlorides and amines. Other processes involve the reaction of anhydrides and amines, the reaction of esters of carboxylic acids and amines, the reaction of isocyanates and carboxylic acids, and the reaction of amines and free carboxylic acids at elevated temperatures with or without the aid of phosphorus trichloride.

It has now been discovered that organic amides may also be prepared in an easy manner and with good yields by condensing organic phosphazo compounds with organic carboxylic acids in accordance with the following general equation:

$$R-N=P-NH-R+2R_1-COOH \rightarrow 2R_1CONHR+HPO_2$$

wherein R and $R_1$ represent members of the group consisting of aromatic and heterocyclic radicals. The amides which are produced by this condensation may be straight aliphatic, alicyclic, aromatic or heterocyclic amides or they may consist of any desired combination of these groupings such as aliphatic-heterocyclic amides, aromatic - alicyclic amides, aliphatic - aromatic amides and the like. Where dicarboxylic acids are reacted with the phosphazo compounds, the monoamide, the diamide, or the imide may be formed depending upon the nature of the acid and the reaction conditions.

The organic phosphazo compounds employed in this process may be obtained by the process of our copending application Serial No. 587,211, filed April 7, 1945, now abandoned, which involves the reaction of an organic primary amine with phosphorus trichloride preferably in the ratio of 5 mols of the amine to 1 mol of the phosphorus trichloride in the presence of an organic solvent. This reaction may be graphically represented as follows:

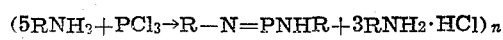
$$(5RNH_2+PCl_3 \rightarrow R-N=PNHR+3RNH_2 \cdot HCl)_n$$

in which $n$ is 1 or 2 and R represents an aromatic nucleus such as phenyl, naphthyl, and the like, or a heterocyclic nucleus such as pyridyl, quinolyl, carbazolyl, diphenylene oxide and the like. These radicals representing R may also be substituted by such substituent groups as halogens, alkyl, alkoxy, amino, substituted amino, and sulfo groups. The R radical may not, however, be substituted by a carboxyl group, or by a nitro group which will be in o- or p-position to the linkage of the R radical to the remainder of the molecule.

In carrying out our new process for the production of organic amides, 1 mol of the organic phosphazo compound is reacted with 1 mol of a dicarboxylic acid or 2 mols of a monocarboxylic acid in an organic solvent at room temperature (20° C.) or higher and preferably at the reflux temperature of the solvent. In place of the 1 mol of organic phosphazo compound, an equivalent amount of the reaction solution obtained by reaction of an organic amine and phosphorus trichloride by the method of our copending application Serial No. 587,211 may be employed as recommended in our said copending application in cases where it is found difficult or unnecessary to effect the isolation of the phosphazo compound. In such cases, the molar equivalency of the reaction solution will be based upon the amount of active phosphorus compounds contained therein. When the condensation of the phosphazo compound and the carboxylic acid compound is completed, the amide dissolved in the clear solvent can in most cases be decanted from the gummy precipitate which is metaphosphorous acid. The amide is then crystallized from the solvent and is thus obtained in excellent purity. It may also be obtained by removing the solvent by steam distillation and subsequently filtering off the amide or by other suitable means of separation. If any further purification of the amide is necessary or desired, it may be recrystallized in alcohol or some other suitable solvent. In cases where the desired amide is a liquid, after removing any solvent, isolation is generally effected by extracting with ether.

The solvent which is employed for the reaction of the phosphazo compound and the carboxylic acid compound may be any normally liquid aliphatic or aromatic hydrocarbon or their chlorinated derivatives such as solvent naphtha, octane, kerosene, benzene, toluene, monochlorbenzene, monochlortoluene, octadecyl chloride, chlorinated kerosene, and the like; oxygenated organic solvents such as ethers and ketones; and normally liquid heterocyclic nitrogenous bases such as pyridine, quinoline, and the like.

It has been indicated above that the phosphazo compounds used in the preparation of the amides of this process have the following general formula:

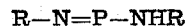
$$R-N=P-NHR$$

or the dimer which is represented by the formula:

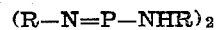
$$(R-N=P-NHR)_2$$

The accuracy of these general formulae has been analytically verified. It is possible, however, that the configuration of the atoms in the molecule is not necessarily linear, but may be as follows:

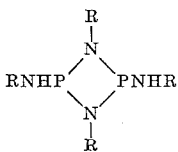

It is, therefore, intended that the general formulae given for the phosphazo compound should be construed as including this cyclic configuration and that the process be not limited to the use of the linear type of compounds for the production of the amides, since the phosphazo compounds, as produced by the reaction of a primary amine with phosphorus trichloride may be formed as the cyclic type of compound. Either form of the phosphazo intermediates will react with the carboxylic acid compounds to form the amides of this application without modification of the process.

The following examples will further serve to illustrate this invention, it being understood that no limitations are implied and the invention is not restricted to the specific materials used therein. Unless otherwise stated, the parts given are by weight.

*Example 1*

7.4 parts of propionic acid and 180 parts of a toluene solution containing the active phosphorus compound obtained from the reaction of 32.3 parts of N-octylamine and 6.9 parts of phosphorus trichloride in accordance with the process of our copending application Serial No. 587,211 and heated to reflux temperature and agitated at moderate reflux for some 1–2 hours. The reaction mixture is then treated with 100 parts of 10% sodium carbonate solution and submitted to steam distillation. 13.8 parts (73% of the theoretical) of crude N-octylpropionamide is separated from the aqueous layer. The N-octylpropionamide oil is then dissolved in ether and the ether solution treated with weak hydrochloric acid; the separated N-octylpropionamide is then distilled under reduced pressure and is obtained as a light yellow colored viscous liquid which boils at 120° to 122° C. at 1.5 mm. Analysis: N calculated 7.56, found 7.62.

*Example 2*

33.4 parts of p-nitrobenzoic acid and 21.4 parts of phenyl phosphazoanilide are heated in 170 parts of toluene to reflux temperature and maintained at a moderate reflux for 1–2 hours. The reaction mixture is then heated with 200 parts of 10% sodium carbonate solution and steam distilled to remove toluene and any free aniline which latter may remain from the preparation of the phenyl phosphazoanilide from aniline and phosphorus trichloride. The precipitated product is p-nitrobenzanilide which is filtered from the alkaline solution containing some recoverable unreacted p-nitrobenzoic acid. 42 parts of nitrobenzanilide were obtained having a melting point of 210–211° C. (Lit. M. P.=210–211° C.).

*Example 3*

24.4 parts of benzoic acid and 180 parts of a toluene solution containing the active phosphorus compound obtained from the reaction of 36.5 parts of N-butylamine and 13.8 parts of phosphorus trichloride in 80 parts of toluene prepared in accordance with the process of our copending application Serial No. 587,211, are heated to reflux temperature and agitated at a moderate reflux for from 1–2 hours. The reaction mixture is then treated with 200 cc. of a 10% sodium carbonate solution and subjected to a steam distillation. It is then extracted with ether and the ether evaporated from the extraction mixture. There remain 19.9 parts of N-butyl benzamide which is recrystallized from benzene-petroleum ether to yield 15.9 parts of pure N-butylbenzamide melting at 41–42° C.

| Analysis | Calculated | Found |
|---|---|---|
| C | 74.54 | 74.52 |
| N | 7.90 | 7.62 |

*Example 4*

24.4 parts of benzoic acid and 180 parts of a toluene solution containing the active phosphorus compound obtained from the reaction of 45.5 parts of cyclohexylamine and 13.8 parts of phosphorus trichloride in 80 parts of toluene in accordance with the process of our copending application Serial No. 587,211 are heated to reflux temperature and agitated at a moderate reflux for 1–2 hours. After the reaction has been completed, the reaction mixture is allowed to stand until a clear toluene solution separates. It is then decanted and crystallized. 22.7 parts of benzamidocyclohexane melted at 145–149° C. (Lit. M. P.=149° C.) are obtained. An additional 5 parts of the benzamidocyclohexane may be obtained from the toluene mother liquor by steam distillation from the sodium carbonate solution followed by ether extraction as described in Example 3.

*Example 5*

24.6 parts of nicotinic acid and 21.4 parts of phenylphosphazoanilide are heated in 170 parts of toluene to reflux temperature and agitated at a moderate reflux for 1–2 hours. After the reaction has been completed, the hot toluene solution is allowed to separate from a sticky residue which has formed and is then decanted from said sticky residue and chilled by outside cooling. 15 parts of crude nicotinanilide having a melting point of 124–126° C. are thus obtained.

*Example 6*

86.5 parts of sulfanilic acid and 75 parts of pyridine are heated to reflux temperature and then cooled to 55° C. The mixture is then treated dropwise with a solution of 13.75 parts of phosphorus trichloride in 15 parts of pyridine in accordance with the process of our copending application Serial No. 587,211. The resulting solution is again brought to reflux temperature and agitated at the reflux temperature for 1–2 hours. It is then cooled to 75° C. and 24.4 parts of benzoic acid are added to the mixture which is again heated to reflux temperature. The reaction mixture is maintained at a moderate reflux for 1–2 hours and is then subjected to an alkaline steam distillation. The clear aqueous alkaline solution remaining in the boiler is cooled and the white crystals formed are filtered and dried. 53.6 parts of crude sodium N-benzoylsulfanilate are collected. The crude product is then recrystallized from water.

| Analysis | Calculated | Found |
|---|---|---|
| N | 4.68 | 4.68 |
| S | 10.70 | 10.81 |

Example 7

20.8 parts of malonic acid and 42.8 parts of phenylphosphazoanilide are heated in 300 parts of toluene to the reflux temperature and agitated at a moderated reflux for 1-2 hours. The reaction mixture is then treated with 350 parts of 10% sodium carbonate solution and steam distilled to remove toluene and any free aniline which may be present. The precipitated product in the boiler is N,N'-diphenylmalonamide which is filtered from the alkaline solution and purified by crystallization from alcohol. 33 parts (65% of the theoretical) of N,N'-diphenylmalonamide were obtained having a melting point of 226-227° (Lit. M. P.=225°).

Having now disclosed our invention and having set forth the best manner in which to perform it, what we claim as new and desire to protect by Letters Patent is:

The process of producing nicotinanilide which comprises reacting a solution of phenylphosphazoanilide in toluene with nicotinic acid and separating the reaction product from the solvent in a suitable manner.

HARRY W. GRIMMEL.
ALFRED GUENTHER.

REFERENCES CITED

The following references are of record in the file of this patent:

UNITED STATES PATENTS

| Number | Name | Date |
|---|---|---|
| 2,146,543 | James et al. | Feb. 7, 1939 |
| 2,146,584 | Lipkin | Feb. 7, 1939 |
| 2,186,769 | Schirm | Jan. 9, 1940 |
| 2,302,703 | Lincoln et al. | Nov. 24, 1942 |
| 2,311,754 | Howard et al. | Feb. 23, 1943 |
| 2,384,811 | Coleman et al. | Sept. 18, 1945 |